United States Patent [19]
Carlebach

[11] Patent Number: 5,227,895
[45] Date of Patent: Jul. 13, 1993

[54] METHOD AND APPARATUS FOR IMAGE REPRODUCTION

[75] Inventor: Ephraim A. Carlebach, Ra'anana, Israel

[73] Assignee: Scitex Corporation Ltd., Herzlia, Israel

[21] Appl. No.: 563,435

[22] Filed: Aug. 3, 1990

[51] Int. Cl.$^5$ .............................................. H04N 1/40
[52] U.S. Cl. .................... 358/456; 358/459
[58] Field of Search ............... 358/455, 456, 457, 458, 358/459, 466, 429, 298, 75

[56] References Cited

U.S. PATENT DOCUMENTS

| | | | |
|---|---|---|---|
| 4,124,870 | 11/1978 | Schatz et al. | 358/429 |
| 4,419,690 | 12/1983 | Hammes | 358/75 |
| 4,456,924 | 6/1984 | Rosenfeld | 358/75 |
| 4,768,101 | 8/1988 | Webb | 358/459 |
| 4,825,298 | 4/1989 | Ikuta et al. | 358/298 |
| 5,150,225 | 9/1992 | Kreitman | 358/456 |

FOREIGN PATENT DOCUMENTS 2157119A 10/1985 United Kingdom.

OTHER PUBLICATIONS

*Suppression of Moire Patterns by Error Feedback*, K. Y. Wong; IBM Tech. Disc. Bull., vol. 20, No. 5, Oct. 77.
Larry G. Wash & John F. Hamilton, Jr., *The Design of a Graphic Arts Halftone Screening Computer*, SPIE, vol. 1073 (1989).

Primary Examiner—Edward L. Coles, Sr.
Assistant Examiner—Jerome Grant, II
Attorney, Agent, or Firm—Darby & Darby

[57] ABSTRACT

Apparatus and a technique for generating a screened reproduction of an image including the steps of: providing a representation of an original having input density values of the original, storing information representing a plurality of desired dot configurations, corresponding to various possible density values; for each coordinate pair in a given region, containing a multiplicity of coordinate pairs, determining whether the given region includes a part of a dot corresponding to the input density of the original; in regions which are determined to include a part of a dot, determining whether a coordinate pair lies within the boundary coordinates of the dot; and operating the plotter to write only if the coordinate pair lies inside the boundary coordinates of the dot, thereby to produce the multiplicity of screen dots of configurations representing the input density values of the original.

15 Claims, 13 Drawing Sheets

COARSE INFORMATION

| X-SIGN | Y-SIGN/MSBs | REGION | VALID | X-BOUNDARY |
|---|---|---|---|---|
| 0 | 0 0 | I | 1 | 4 |
| 0 | 0 1 | II | 0 | DON'T CARE |
| 0 | 1 0 | III | 1 | 4 |
| 0 | 1 1 | IV | 1 | 0 |
| 1 | 0 0 | V | 1 | 4 |
| 1 | 0 1 | VI | 1 | 0 |
| 1 | 1 0 | VII | 1 | 4 |
| 1 | 1 1 | VIII | 1 | 0 |

FINE INFORMATION

| REGION | \|X\| | Y-BOUNDARY | REGION | \|X\| | Y-BOUNDARY |
|---|---|---|---|---|---|
| I | 0 | 3 | V | 0 | 3 |
| I | 1 | 3 | V | 1 | 3 |
| I | 2 | 2 | V | 2 | 2 |
| I | 3 | 1 | V | 3 | 1 |
| I | 4 | 0 | V | 4 | 0 |
| I | 5 | DON'T CARE | V | 5 | DON'T CARE |
| I | 6 | DON'T CARE | V | 6 | DON'T CARE |
| I | 7 | DON'T CARE | V | 7 | DON'T CARE |
| II | 0 | DON'T CARE | VI | 0 | 0 |
| II | 1 | DON'T CARE | VI | 1 | DON'T CARE |
| II | 2 | DON'T CARE | VI | 2 | DON'T CARE |
| II | 3 | DON'T CARE | VI | 3 | DON'T CARE |
| II | 4 | DON'T CARE | VI | 4 | DON'T CARE |
| II | 5 | DON'T CARE | VI | 5 | DON'T CARE |
| II | 6 | DON'T CARE | VI | 6 | DON'T CARE |
| II | 7 | DON'T CARE | VI | 7 | DON'T CARE |
| III | 0 | 3 | VII | 0 | 3 |
| III | 1 | 3 | VII | 1 | 3 |
| III | 2 | 2 | VII | 2 | 2 |
| III | 3 | 1 | VII | 3 | 1 |
| III | 4 | 0 | VII | 4 | 0 |
| III | 5 | DON'T CARE | VII | 5 | DON'T CARE |
| III | 6 | DON'T CARE | VII | 6 | DON'T CARE |
| III | 7 | DON'T CARE | VII | 7 | DON'T CARE |
| IV | 0 | 0 | VIII | 0 | 0 |
| IV | 1 | DON'T CARE | VIII | 1 | DON'T CARE |
| IV | 2 | DON'T CARE | VIII | 2 | DON'T CARE |
| IV | 3 | DON'T CARE | VIII | 3 | DON'T CARE |
| IV | 4 | DON'T CARE | VIII | 4 | DON'T CARE |
| IV | 5 | DON'T CARE | VIII | 5 | DON'T CARE |
| IV | 6 | DON'T CARE | VIII | 6 | DON'T CARE |
| IV | 7 | DON'T CARE | VIII | 7 | DON'T CARE |

METHOD AND APPARATUS FOR IMAGE REPRODUCTION

FIELD OF THE INVENTION

The present invention relates to the recording of a halftone picture and more particularly to a method and apparatus for electronic halftone dot generation in image reproduction.

BACKGROUND OF THE INVENTION

Electronic screening for image reproduction is well established in the art. According to a well known technique described in U.S. Pat. No. 4,456,924 of the present assignee, for each screened dot, a multiplicity of coordinates of a laser plotter are translated into screen-cell coordinates. A corresponding cell memory is preloaded by threshold values, defining a cell memory matrix. Input digitized scanned density values of an image, such as a color separation, are compared with the threshold values, cell by cell. The results provide a on/off control input for a laser plotter.

U.S. Pat. No. 4,825,298 to Ikuta and Murai describes a technique for generating a screened reproduction of an image in which the density distribution of a given screen dot is expressed in three dimensions, wherein the area of the screen dot is expressed along X and Y axes and the density is expressed along a Z axis perpendicular thereto. A film coordinate generator generates film coordinates (u,v), corresponding to the position of an exposure beam on a recording film which is detected by encoders, which is in turn supplied to a screen coordinate generator to be converted into virtual screen coordinates (x,y). A beam control signal generator receives the coordinates (x,y) and an image signal corresponding to the position of the exposure beam to output a beam control signal indicting lighting of the exposure beam when one of the coordinates (x,y) is between upper and lower limit values, corresponding to the same, which are previously decided for each combination of the other of the coordinates (x,y) and the density value of the image signal.

The technique of U.S. Pat. No. 4,825,298 to Ikuta and Murai has the disadvantage that its memory requirements are high.

U. K. Published Patent Application 2,157,119A to Ikuta describes apparatus which operates similarly to the technique of U.S. Pat. No. 4,456,924 but does not employ a matrix memory. Instead, the threshold function is calculated on the fly in real time or near real time. This apparatus is limited to relatively simple dot configurations.

In an article entitled "The design of a graphic arts halftone screening computer" by Larry G. Wash & John F. Hamilton, Jr., SPIE, Vol. 1073 Electronic Imaging Applications in Graphic Arts (1989) pp. 26–50, there is described apparatus for digital screening in which a three-dimensional memory array is employed for screen dot generation.

SUMMARY OF THE INVENTION

The present invention seeks to provide an improved technique for generating a screened reproduction of an image.

There is thus provided in accordance with a preferred embodiment of the present invention a technique for generating a screened reproduction of an image comprising the steps of:

providing a representation of an original having input density values of the original, storing information representing a plurality of desired dot configurations, corresponding to various possible density values;

for each coordinate pair in a given region, containing a multiplicity of coordinate pairs, determining whether the given region includes a part of a dot corresponding to the input density of the original;

in regions which are determined to include a part of a dot, determining whether a coordinate pair lies within the boundary coordinates of the dot; and operating the plotter to write only if the coordinate pair lies inside the boundary coordinates of the dot, thereby to produce a multiplicity of screen dots of configurations representing the input density values of the original.

Additionally in accordance with an embodiment of the invention, the step of determining whether the coordinate pair lies within the boundary coordinates of the dot includes the steps of determining whether one coordinate of the coordinate pair lies within the corresponding boundary coordinate of the dot and determining whether the other coordinate of the coordinate pair lies within the other boundary coordinate of the dot only for those coordinate pairs for which the first coordinate lies within the corresponding boundary coordinate of the dot.

Further in accordance with an embodiment of the invention there is provided a technique for generating a screened reproduction of an image including the steps of:

providing a representation of an original having input density values of the original;

storing information representing a plurality of desired dot configurations, corresponding to various possible density values for a multiplicity of screened dots;

for each coordinate pair determining whether the coordinate pair lies within the boundary coordinates of the dot, including the step of determining whether at least one coordinate of the coordinate pair lies within a single corresponding boundary coordinate of the dot; and operating the plotter to write only if the coordinate pair lies inside the boundary coordinates of the dot, thereby to produce a multiplicity of screen dots of configurations representing the input density values of the original.

Additionally in accordance with an embodiment of the invention there is provided apparatus for generating a screened reproduction of an image including:

apparatus for providing a representation of an original having input density values of the original;

apparatus for storing information representing a plurality of desired dot configurations, corresponding to various possible density values for a multiplicity of screened dots;

apparatus for determining, for each coordinate pair in a given region, containing a multiplicity of coordinate pairs, whether the given region includes a part of a dot corresponding to the input density of the original;

apparatus operative, in regions which are determined to include a part of a dot, for determining whether a coordinate pair lies within the boundary coordinates of the dot; and apparatus for operating the plotter to write only if the coordinate pair lies inside the boundary coordinates of the dot, thereby to produce a multiplicity of screen dots of configurations representing the input density values of the original.

Further in accordance with an embodiment of the invention, the apparatus for determining whether a coordinate pair lies within the boundary coordinates of the dot comprises means for determining whether one coordinate of the coordinate pair lies within the corresponding boundary coordinate of the dot and determining whether the other coordinate of the coordinate pair lies within the other boundary coordinate of the dot only for those coordinate pairs for which the first coordinate lies within the corresponding boundary coordinate of the dot.

Additionally in accordance with a preferred embodiment of the invention there is provided apparatus for generating a screened reproduction of an image including:

means for providing a representation of an original having input density values of the original;

means for storing information representing a plurality of desired dot configurations, corresponding to various possible density values for a multiplicity of screened dots;

means for determining for each coordinate pair whether the coordinate pair lies within the boundary coordinates of the dot, including the step of determining whether at least one coordinate of the coordinate pair lies within a single corresponding boundary coordinate of the dot; and means for operating the plotter to write only if the coordinate pair lies inside the boundary coordinates of the dot, thereby to produce a multiplicity of screen dots of configurations representing the input density values of the original.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

Figure 1:
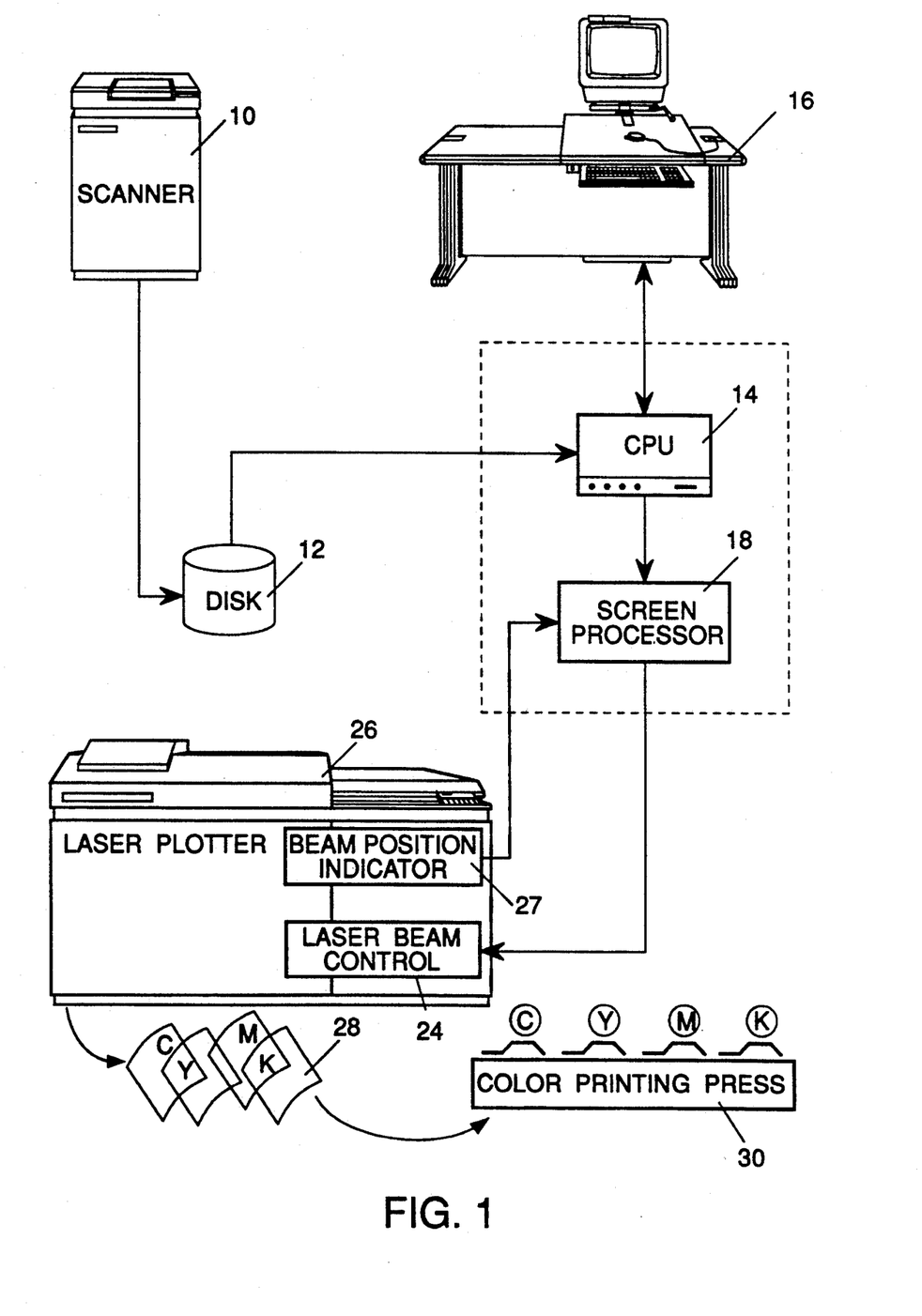
FIG. 1 is a simplified block diagram illustration of a process color printing system constructed and operative in accordance with a preferred embodiment of the present invention.

Reference is now made to FIG. 1, which illustrates a system for generating a screened reproduction of an image constructed and operative in accordance with a preferred embodiment of the present invention. The system preferably comprises a color separation scanner 10, such as a Scitex Smart Scanner, manufactured and sold by Scitex Corporation Ltd. of Herzlia, Israel, which is adapted to provide a digital color separation output of a color original.

The digital output of scanner 10 is normally stored on an image data disk 12 or any other suitable storage medium, which is accessible by a CPU 14, such as an Intel 80386. Interfacing with the CPU 14 is an interactive workstation 16, such as a Scitex Prisma, manufactured and sold by Scitex Corporation Ltd. of Herzlia, Israel.

CPU 14 also interfaces with screen processor circuitry 18 which provides a control output to laser beam control circuitry 24 in a laser plotter 26, such as a Raystar, manufactured and sold by Scitex Corporation Ltd. of Herzlia, Israel. The laser plotter 26 includes beam position indicator apparatus 27, which provides an output to screen processor 18.

Laser plotter 26 produces halftone film color separations 28 which are employed in a conventional process color printing press 30, to produce process color prints.

Screen control circuitry 18 is illustrated in greater detail in FIG. 10 and will be described hereinbelow.

Figure 2:
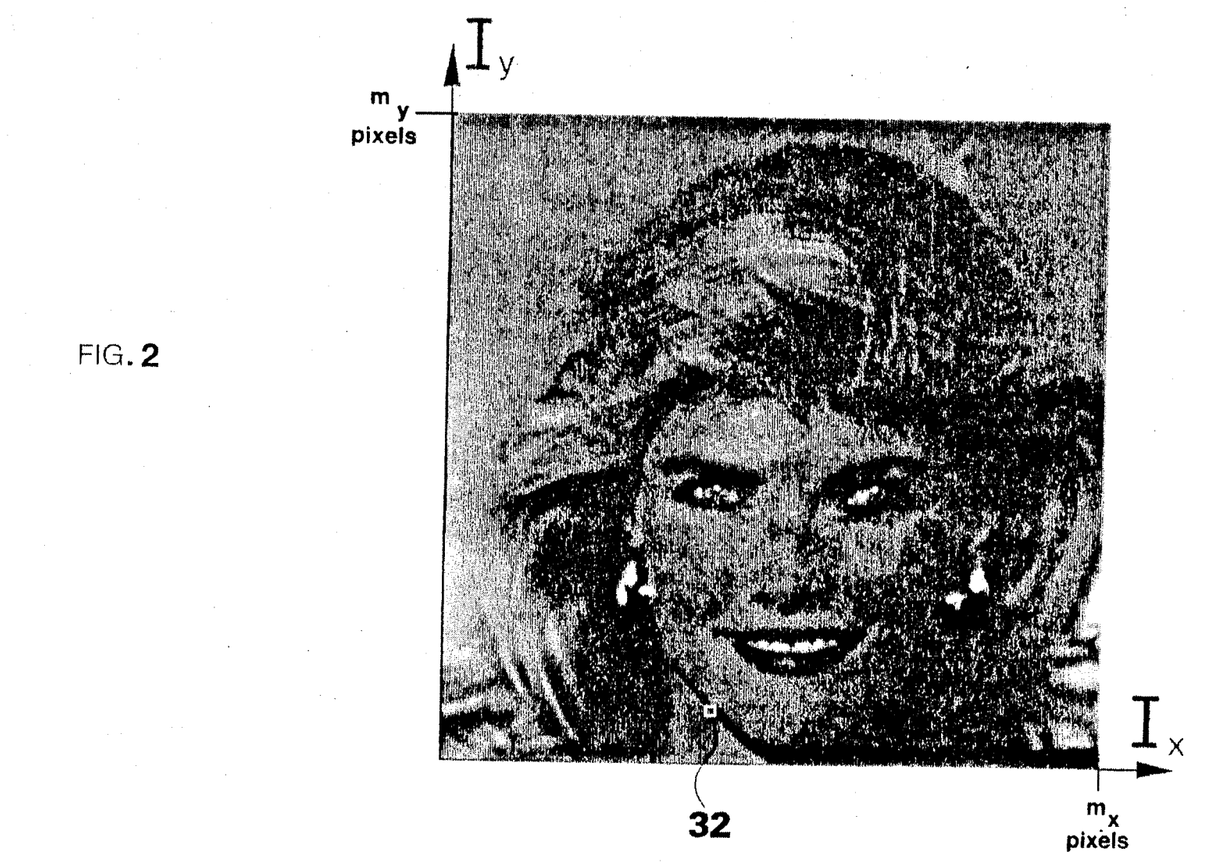
FIG. 2 is an illustration of a typical halftone color separation.
Figure 3:
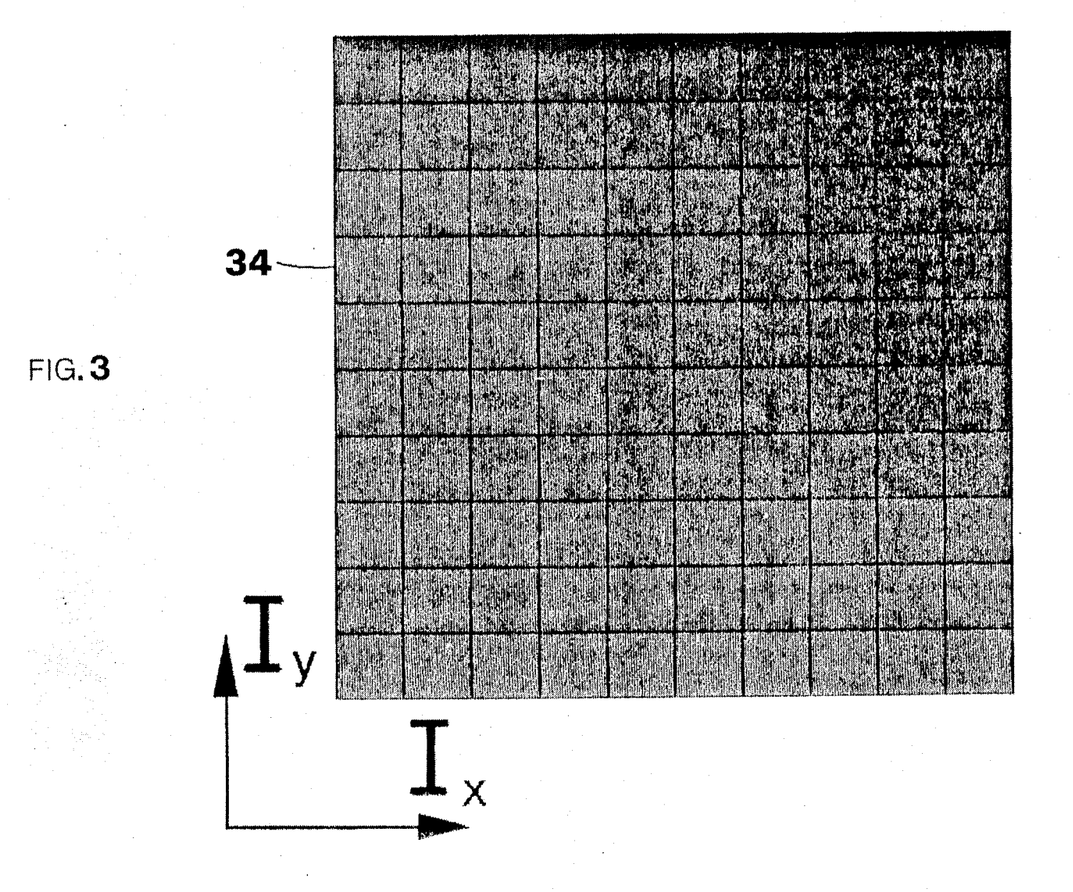
FIG. 3 is an enlarged illustration of a small portion of the halftone color separation of FIG. 2.

Reference is now made to FIGS. 2 and 3. FIG. 2 illustrates a typical halftone color separation which is stored on disc 12. FIG. 3 illustrates in enlarged detail, a small area 32 indicated on FIG. 2. It is noted that the gray level over area 32 varies thereacross.

The halftone color separation in general and the small area 32 in particular are hereinafter termed the input image and are divided into a first multiplicity of pixels 34 which are arranged along coordinates $I_x$ and $I_y$. Pixels 34 typically have a resolution of 100–400 pixels per inch along each of the coordinate axes of the input image.

Figure 4:
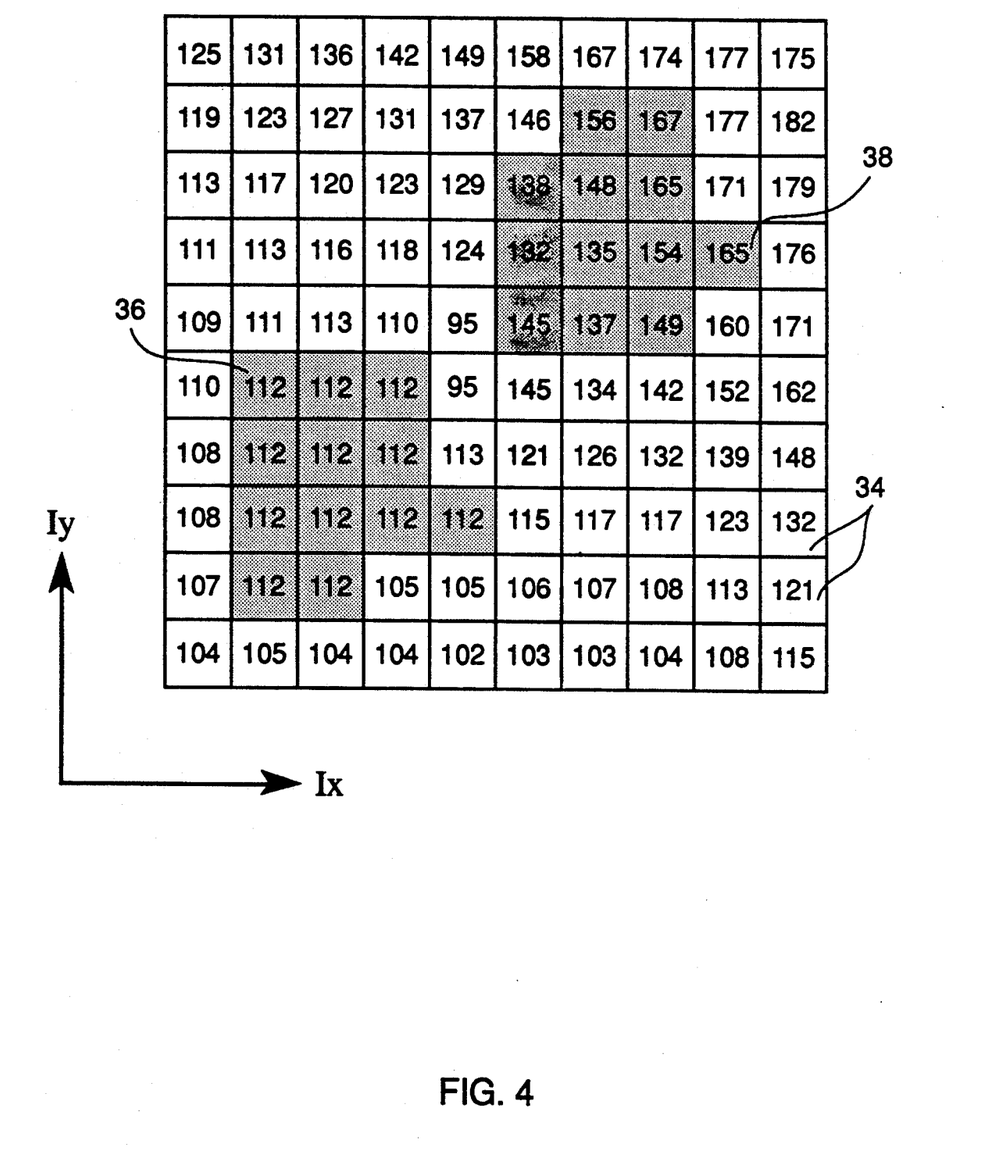
FIG. 4 is an illustration of pixel-by-pixel input density values for the small portion of the color separation shown in FIG. 3.

Each average gray level for a pixel 34 is represented digitally by an input density level. There are typically provided 256 different input density levels, 0 being the lightest and 255 being the blackest. FIG. 4 illustrates the input density values for the pixels 34 of FIG. 3.

One preferred embodiment of the present invention is characterized in that, in contrast to the prior art, it employs relatively coarse and relatively fine output dot information for each of 256 input density values. The relatively coarse and relatively fine output dot information is preferably stored in look-up tables forming part of screen processor 18 (FIG. 1). The relatively coarse and relatively fine information is generally defined in accordance with an output dot density distribution corresponding to each given output dot configuration.

Figure 5:
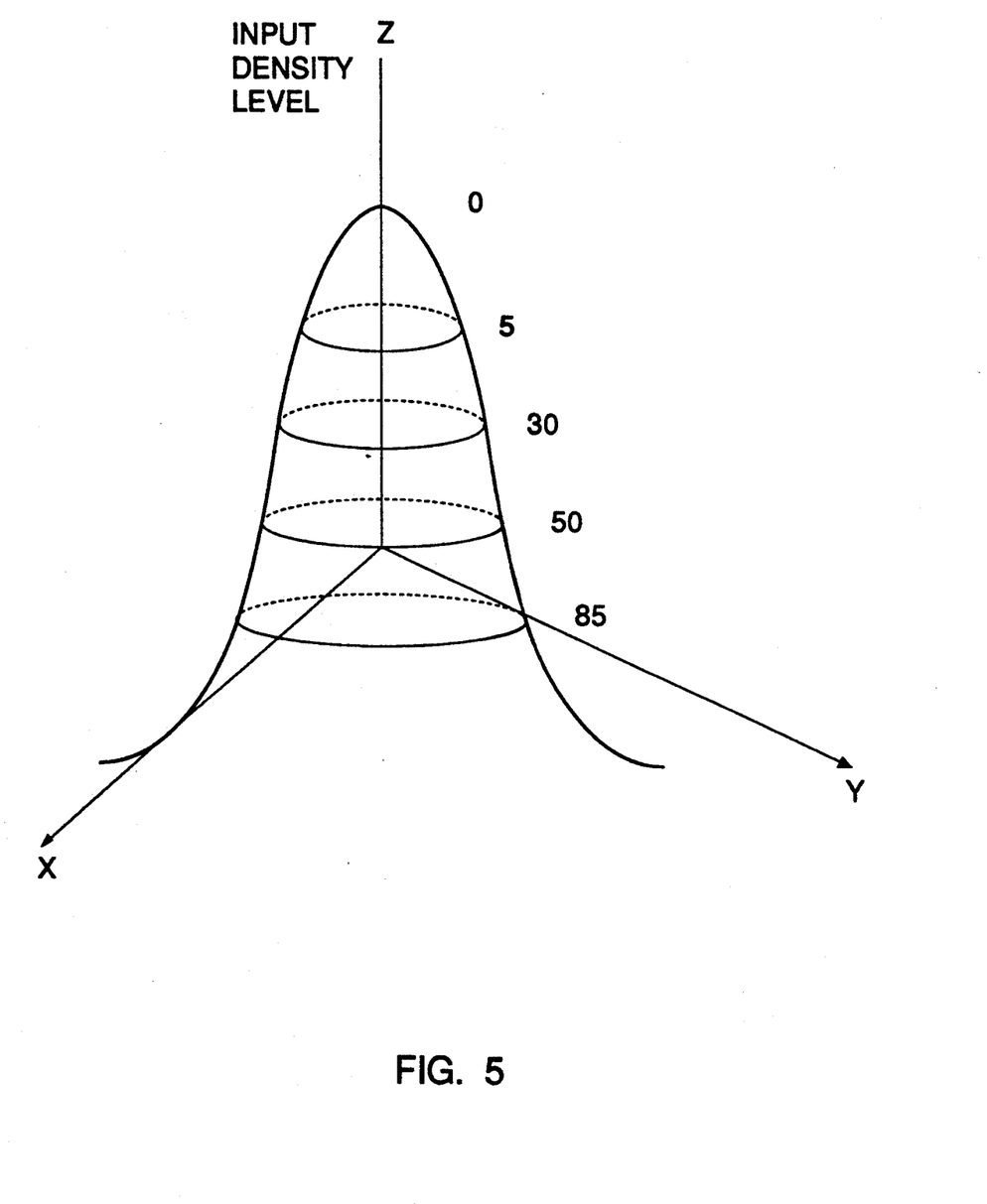
FIG. 5 is an illustration of the derivation of dot density cross-sections from a dot density distribution for a given dot configuration.

FIG. 5 illustrates an output dot density distribution for a conventional C dot, which is used in process color printing. FIG. 5 shows the various cross sections of the output density dot distribution for various corresponding input density values, the cross section defining the dot configuration corresponding to each input density value.

Figure 6:
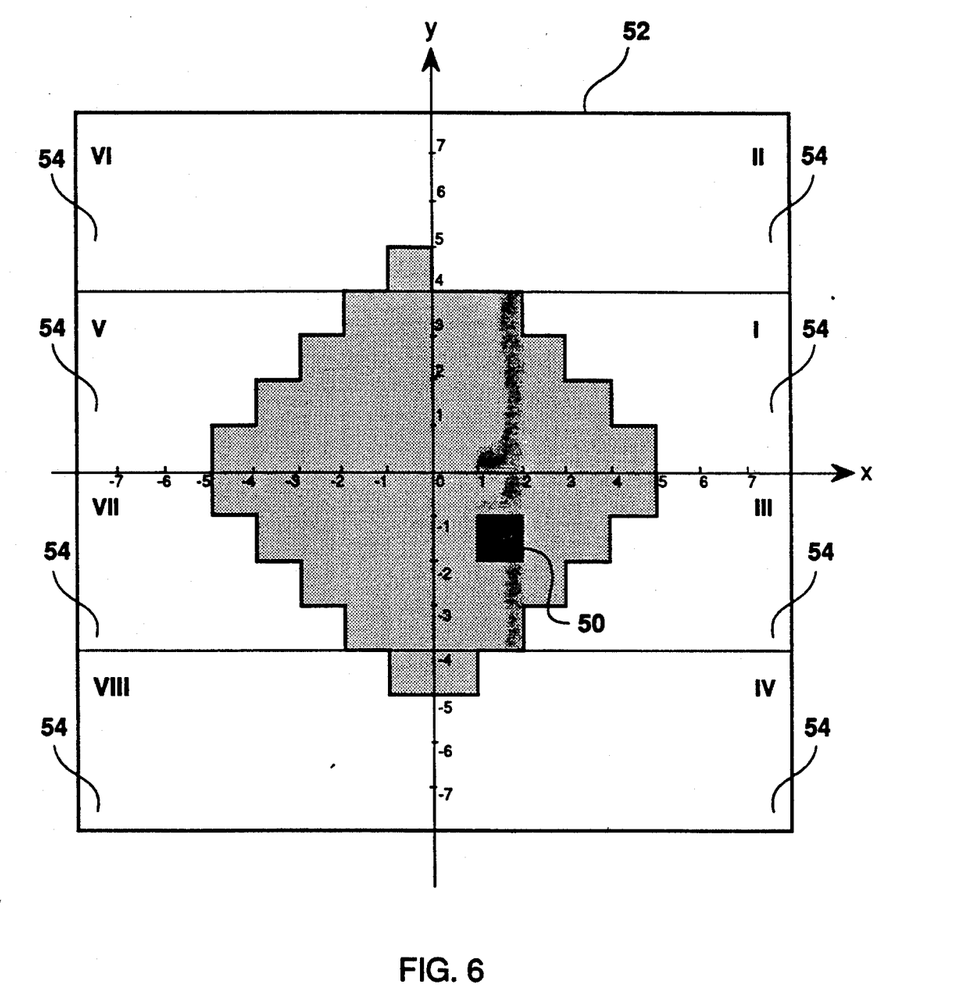
FIG. 6 is an illustration of the construction of a typical dot configuration for a given input density.

Reference is now made to FIG. 6, which illustrates a typical dot configuration for a typical input density, here 59. The dot is built up of a multiplicity of elemental units 50, each covering an area of 1/256 of the total maximum dot area 52. The maximum dot area 52 is preferably divided into a plurality of regions 54, here selected to be eight in number. It is appreciated that a greater or lesser number of regions may be employed.

In accordance with a preferred embodiment of the invention, the dot configuration is stored in terms of dot boundary information as a plurality of coordinates defining the dot boundaries.

It is a particular feature of the present invention that for a given location in a given region, only the boundary information for that region is employed.

Figure 7:
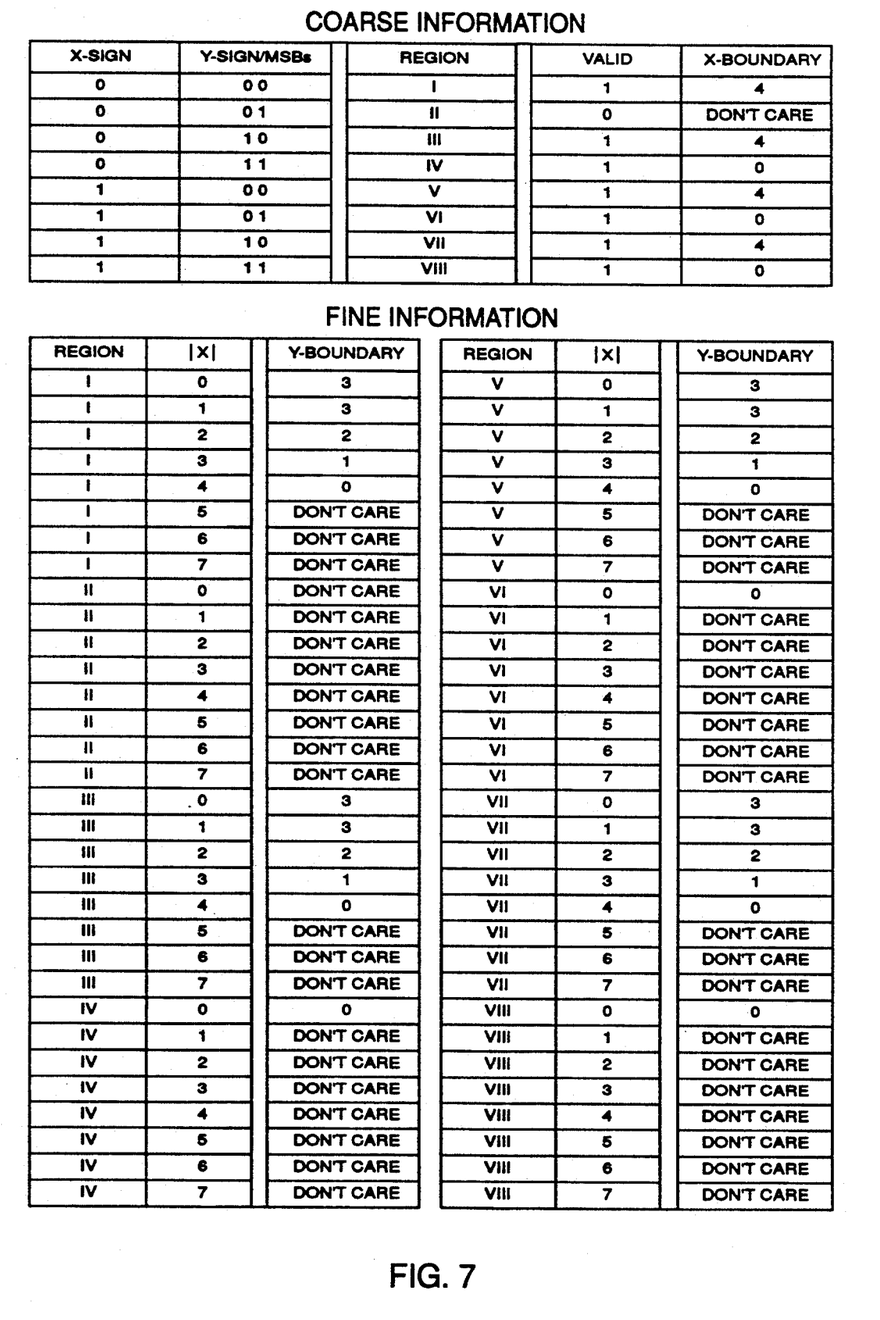
FIG. 7 is an illustration of look-up tables which store information defining dot configurations for each input density value for a given type of dot configuration corresponding to the dot configuration illustrated in FIG. 6.

FIG. 7 illustrates the contents of look-up tables containing coarse and fine information for the dot configuration of FIG. 6. It is noted the most significant bit or bits of the x,y coordinates of any point in the area identify to which region each point belongs. The x,y coordinates may be virtual screen coordinates derived from u,v coordinates defining the beam position on a recording medium. The coarse information in the look-up table indicates whether a given region contains any part of the dot configuration (VALID/NOT VALID) and the innermost x coordinate of the outermost elemental unit 50 of the dot configuration for that region.

The look-up table containing the fine information indicates for a given region and for each absolute value of the x coordinate of a given location therein, the difference of the innermost y coordinate of the outermost elemental unit 50 of the dot configuration, whose innermost x coordinate is equal to the x coordinate of the location, from the innermost y coordinate of the region, if part of the dot appears in that region.

The screen processor 18 is operative to determine which regions contain parts of a dot and for those regions to compare the boundaries stored in the look-up tables with the x,y locations to determine whether laser writing at each such x,y location should take place.

In accordance with an embodiment of the invention, if the x coordinate of a given location is found to be outside the boundary, no inquiry is made regarding the y coordinate.

It is appreciated that in the foregoing discussion, and in FIG. 7, the x and y coordinates may be switched.

Figure 8A:
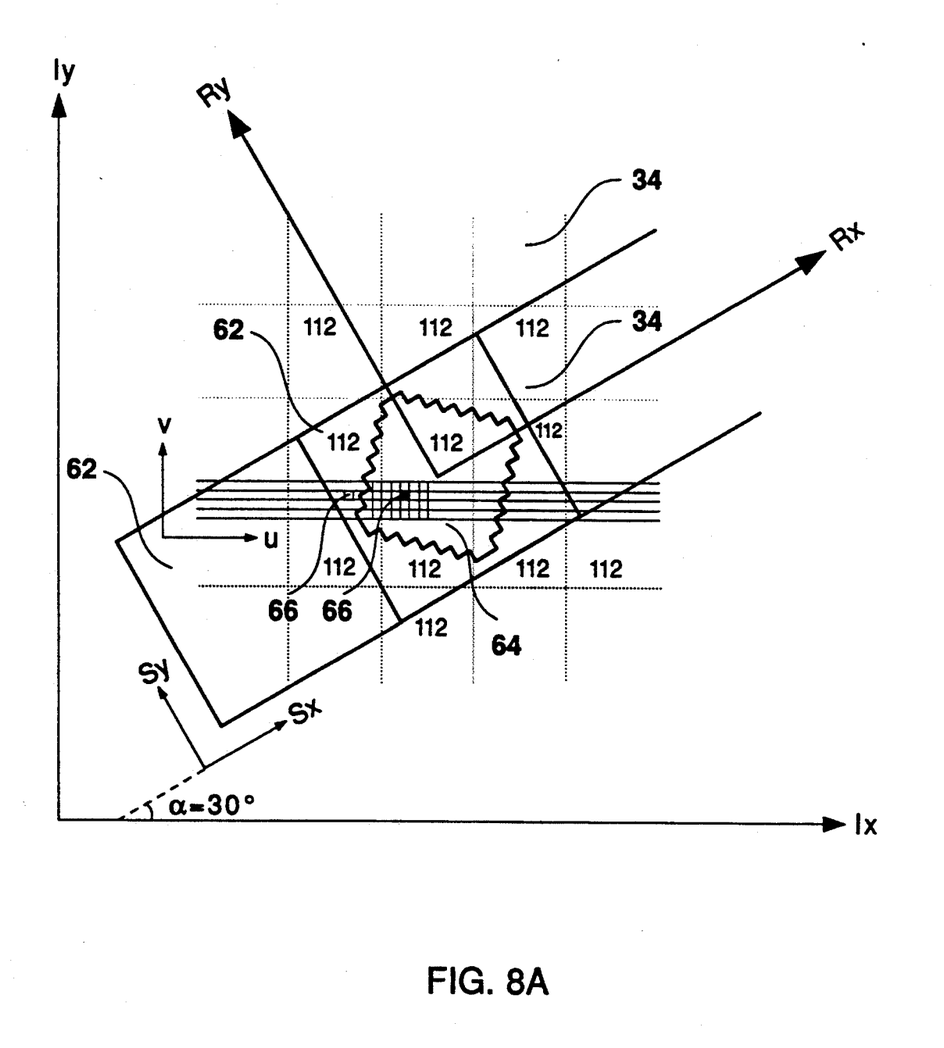
FIGS. 8A, 8B and 8C illustrate the construction of a dot using a laser plotter in accordance with the present invention.

Reference is now made to FIG. 8A, which illustrates the construction of an output dot employing a rotated screen having a mesh different from the resolution of the scanner 10, for a portion 40 of the image illustrated in FIGS. 3 and 4. The input density values for the pixels 34 are indicated within each pixel and it is seen that they are all uniform.

The rotated screen defines a second multiplicity of cells 62, lying along coordinate axes $S_x$, $S_y$, which are rotated with respect to coordinate axes $I_x$, $I_y$ by a given angle, typically 30 degrees. Each output dot 64, also referred to as a screen dot, is generally centered within a cell 62. The mesh of the rotated screen defines the size of cells 62 and provides output dots having a typical spatial frequency of 60–200 dots per inch in the output image. The internal coordinates of each cell are given as $R_x$, $R_y$.

Each output dot 64 is made up of a third multiplicity of points 66 which normally have a significantly higher resolution than pixels 34 and which are produced by laser plotter 26 (FIG. 1), which operates along coordinates u, v, which are normally parallel to coordinates $I_x$, $I_y$. Typical resolution of points 66 is 800–5000 points per inch of the output image.

Figure 8B:
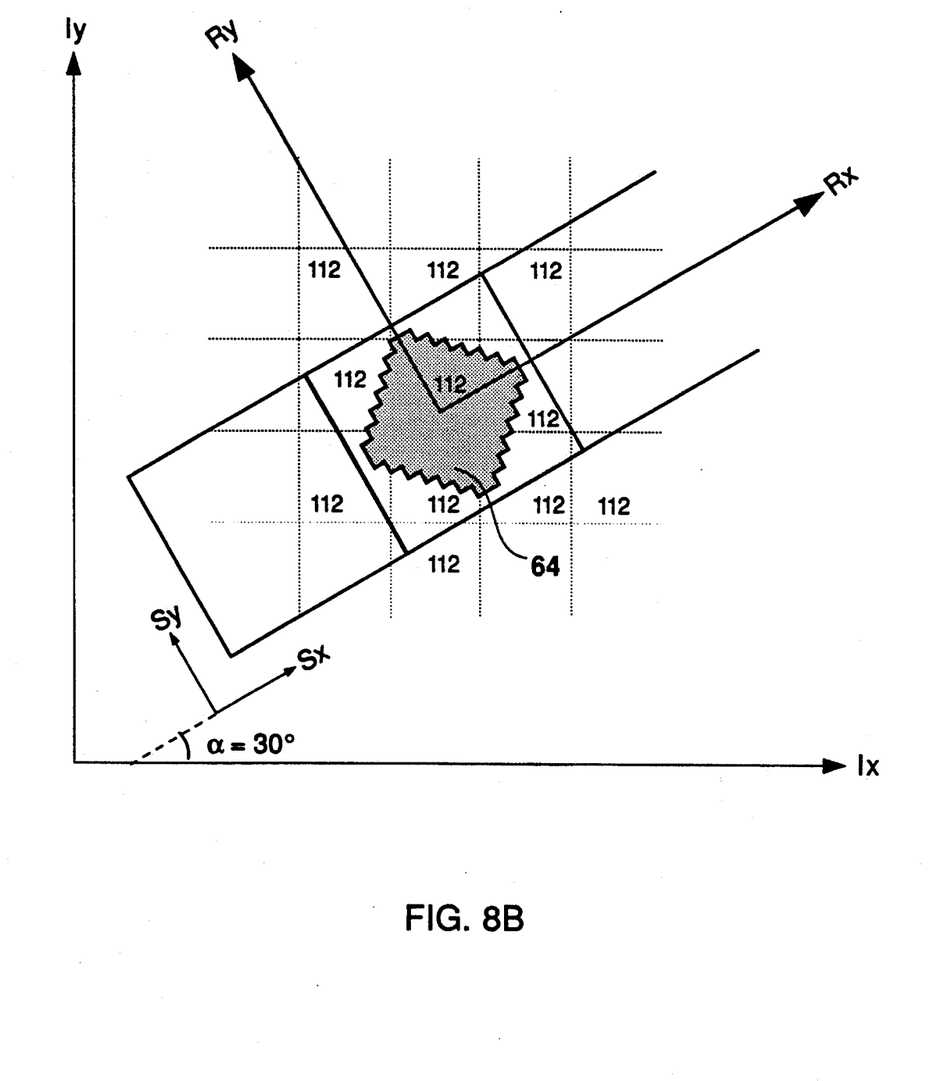

FIG. 8B illustrates a completed dot produced by the technique described above for the same location on the input image.

Figure 8C:
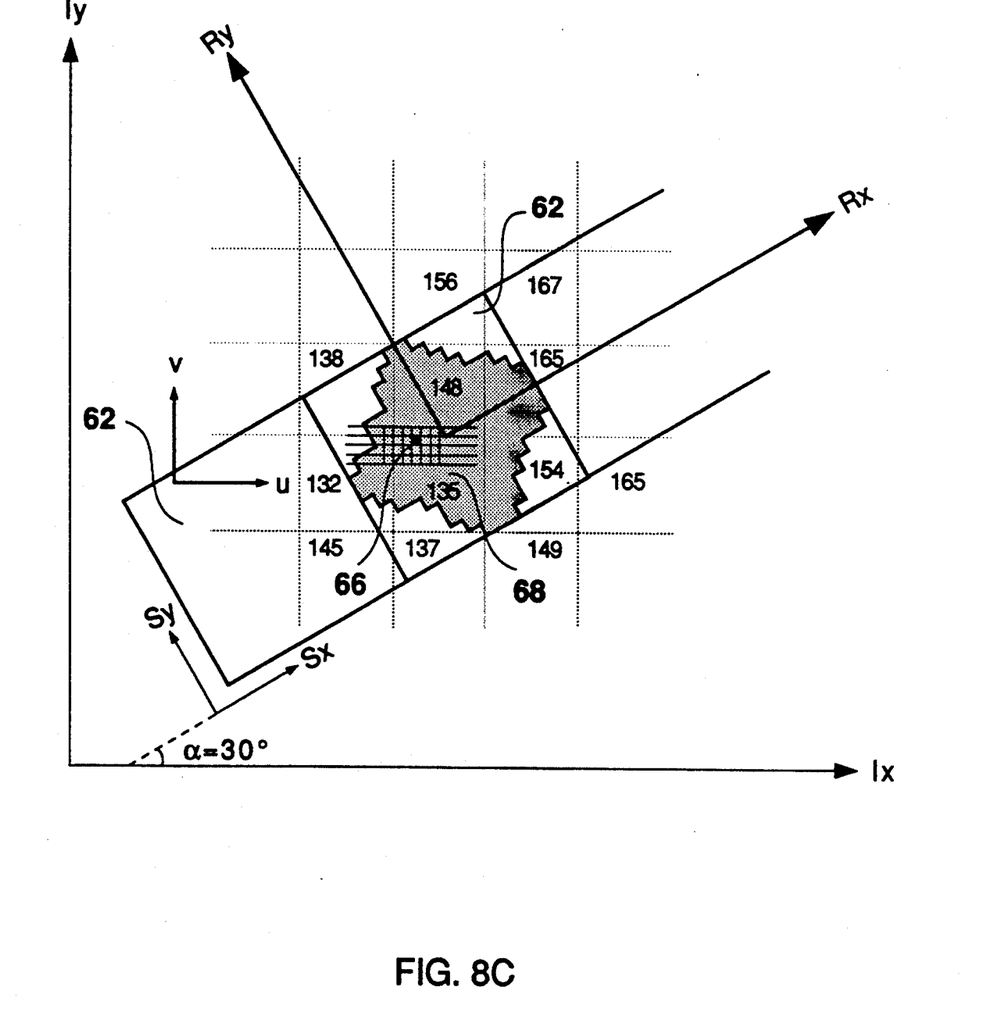

Reference is now made to FIG. 8C, which illustrates the construction of an output dot employing a rotated screen having a mesh different from the resolution of the scanner 10, for a portion 42 of the image illustrated in FIGS. 3 and 4. The input density values for the pixels 34 are indicated within each pixel and it is seen that they differ from each other.

As in the example of FIGS. 8A and 8B, the rotated screen defines a second multiplicity of cells 62, lying along coordinate axes $S_x$, $S_y$, which are rotated with respect to coordinate axes $I_x$, $I_y$ by a given screen rotation angle a, typically 30 degrees. Each output dot 68, also referred to as a screen dot, is generally centered within a cell 62. The mesh of the rotated screen defines the size of cells 62 and provides output dots having a typical spatial frequency of 60–200 dots per inch in the output image. The internal coordinates of each cell are given as $R_x$, $R_y$.

It is appreciated from a consideration of FIG. 8C, that the output dot configuration at each location is a function of the input density value for the pixel 34 over which that location lies. Thus where the input density value is relatively low, such as 132, the dot configuration corresponds to a relatively small dot area and where the input density value is high, such as 165, the dot configuration corresponds to a relatively large dot area. An output dot which overlies pixels 34 having different input density values is thus configured in a manner generally corresponding to the arrangement of the input density values of the pixels 34 represented by the output dot.

As in the example of FIGS. 8A and 8B, each output dot 68 is made up of a third multiplicity of points 66 which normally have a significantly higher resolution than pixels 34 and which are produced by laser plotter 26 (FIG. 1), which operates along coordinates u, v, which are normally parallel to coordinates $I_x$, $I_y$. Typical resolution of points 66 is 800–5000 points per inch of the output image.

Figure 9:
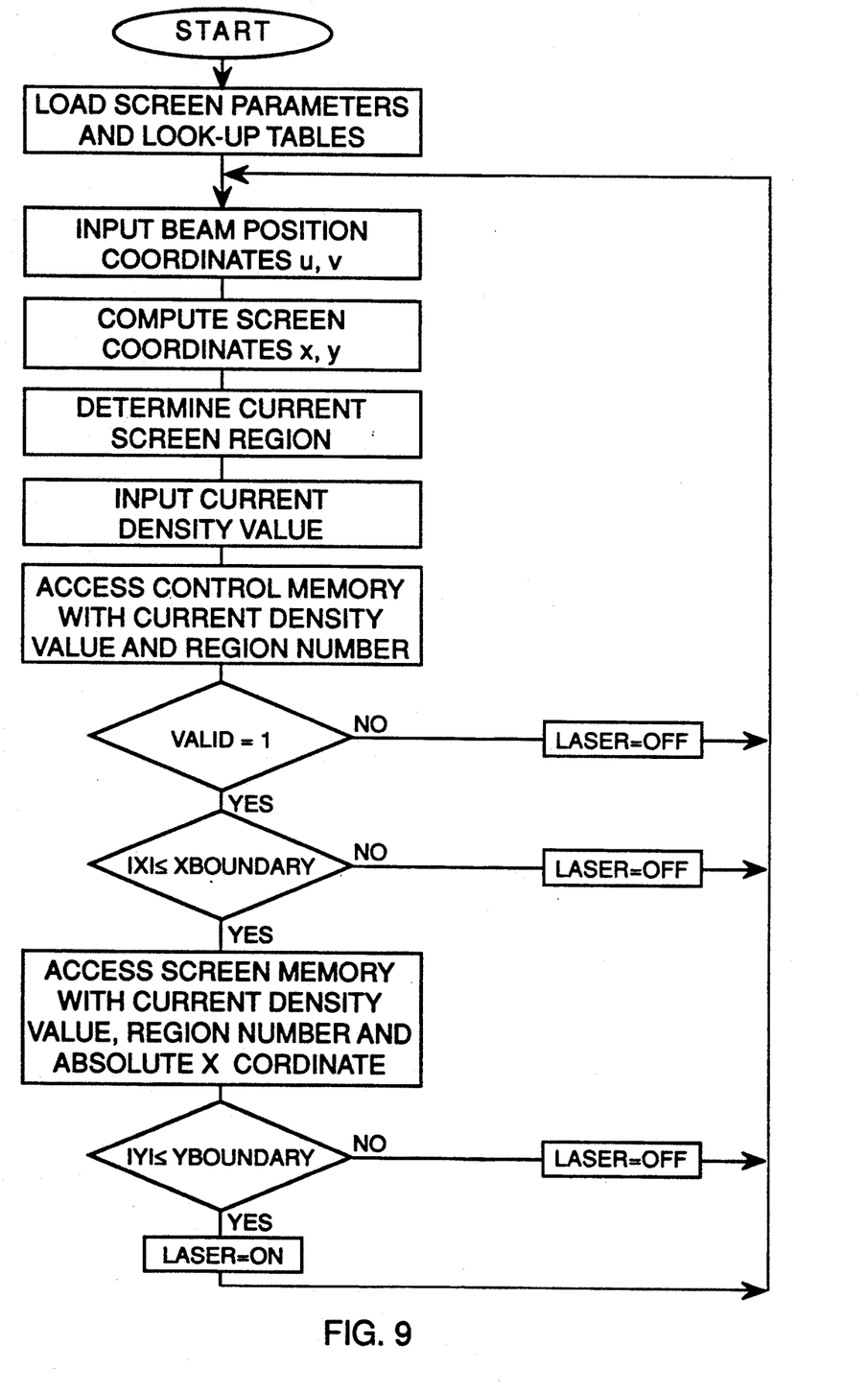
FIG. 9 is a detailed flowchart illustrating operation of the dot generation apparatus of the system of FIG. 1 using the dot configuration information shown in FIG. 7 in controlling the laser printer to produce desired printing dots.
Figure 10:
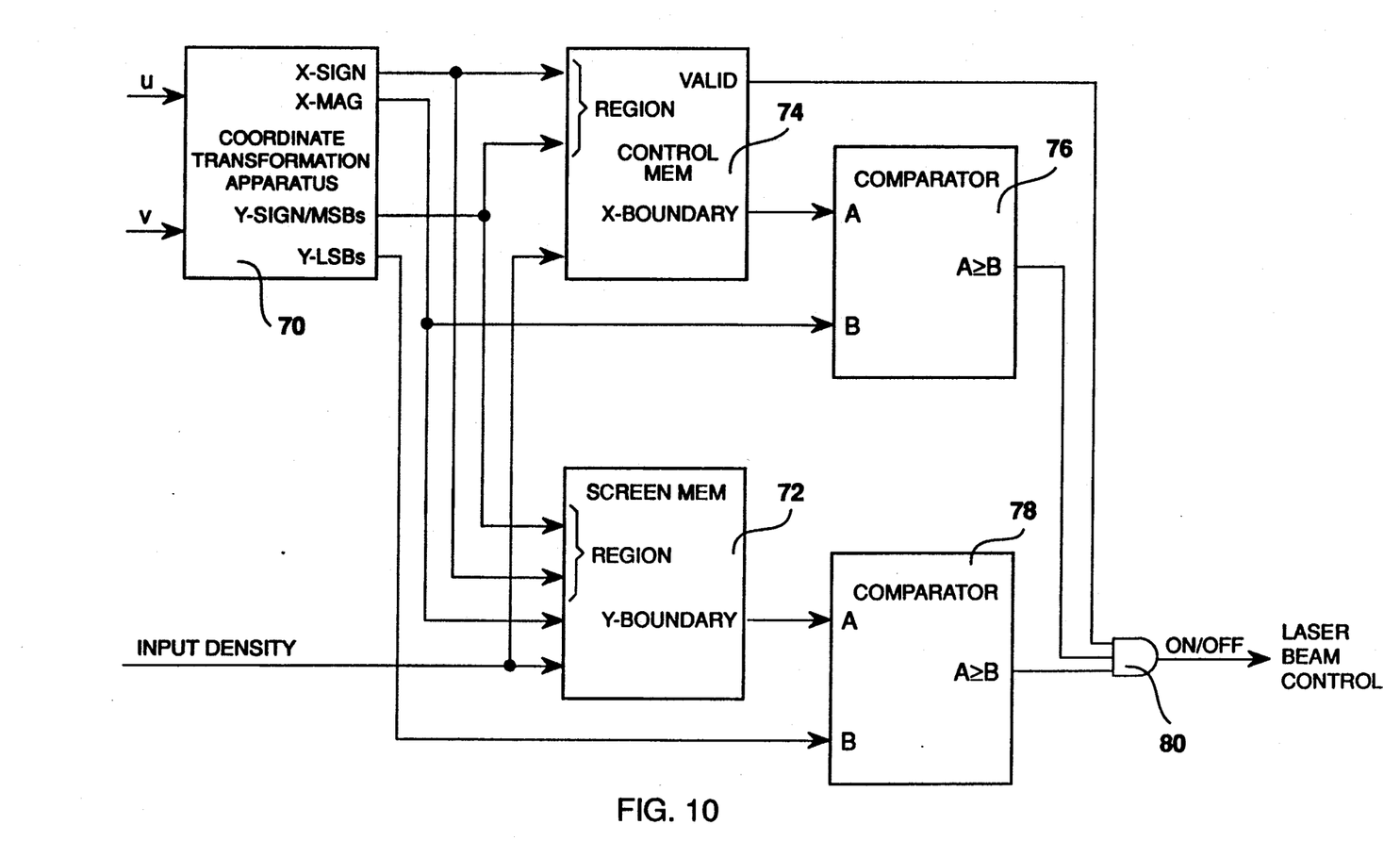
FIG. 10 is a block diagram illustration of electronic circuitry employed in the system of FIG. 1.

Reference is now made to FIG. 9, which is a flow chart illustrating the decision functions determining whether the laser plotter writes at a given location 66 and to FIG. 10, which illustrates the screen processor 18.

The input coordinates u,v of each point 66 are supplied by the beam position indicator 27 (FIG. 1) to a coordinate transformation apparatus 70 in the screen processor 18. The coordinate transformation apparatus 70 provides the corresponding screen coordinates x,y (FIG. 6) and also identifies the region 54 in the space 52 (FIG. 6).

The input density value is received at a screen memory 72 and at a control memory 74 in screen processor 18 from CPU 14. The screen memory 72 contains the fine information exemplified in FIG. 7, while the control memory 74 contains the coarse information exemplified in FIG. 7.

The control memory 74 is operative to provide a VALID/NOT VALID output indication in response to the input density value and the most significant bits of the x,y coordinates of location 66, which it receives from apparatus 70. Only if part of the output dot is located in a given region, does that region receive a VALID indication.

The control memory 74 is also operative to provide for each VALID region an output indication of the innermost x coordinate of the outermost elemental unit 50 of the dot configuration for that region.

For all locations in regions not having a VALID indication, the laser is not operated. For locations in regions having a VALID indication, the control memory outputs the innermost x coordinate of the outermost elemental unit 50 of the dot configuration for that region to a comparator 76, which indicates whether the x coordinate of location 66 lies within the x coordinate of the dot boundary in that region. Typically the absolute coordinates are employed.

According to a preferred embodiment of the invention, as illustrated in FIG. 9, if the x coordinate of location 66 does not lie within the x coordinate of the dot boundary, no similar inquiry is made of the y coordinate, although both inquiries may be conducted concurrently, by the apparatus shown in FIG. 10.

Screen memory 72, for a given region and for each absolute value of the x coordinate of a given location therein, outputs to a comparator 78, the difference of the innermost y coordinate of the outermost elemental unit 50 of the dot configuration, whose innermost x coordinate is equal to the x coordinate of the location, from the innermost y coordinate of the region, if part of the dot appears in that region.

Comparator 78 indicates whether the y coordinate of location 66 lies within the y coordinate of the dot boundary whose innermost x coordinate is equal to the x coordinate of the location in that region. If not, the laser is not operated for that location 66. If yes, the laser is operated.

In FIG. 10, an AND gate 80 provides a driving output to the laser only when all of the following conditions are fulfilled:

a VALID output from control memory 74 is present;
the x coordinate of location 66 lies within the x coordinate of the dot boundary in that region;
the y coordinate of location 66 lies within the y coordinate of the dot boundary whose innermost x coordinate is equal to the x coordinate of the location in that region.

Figure 11:
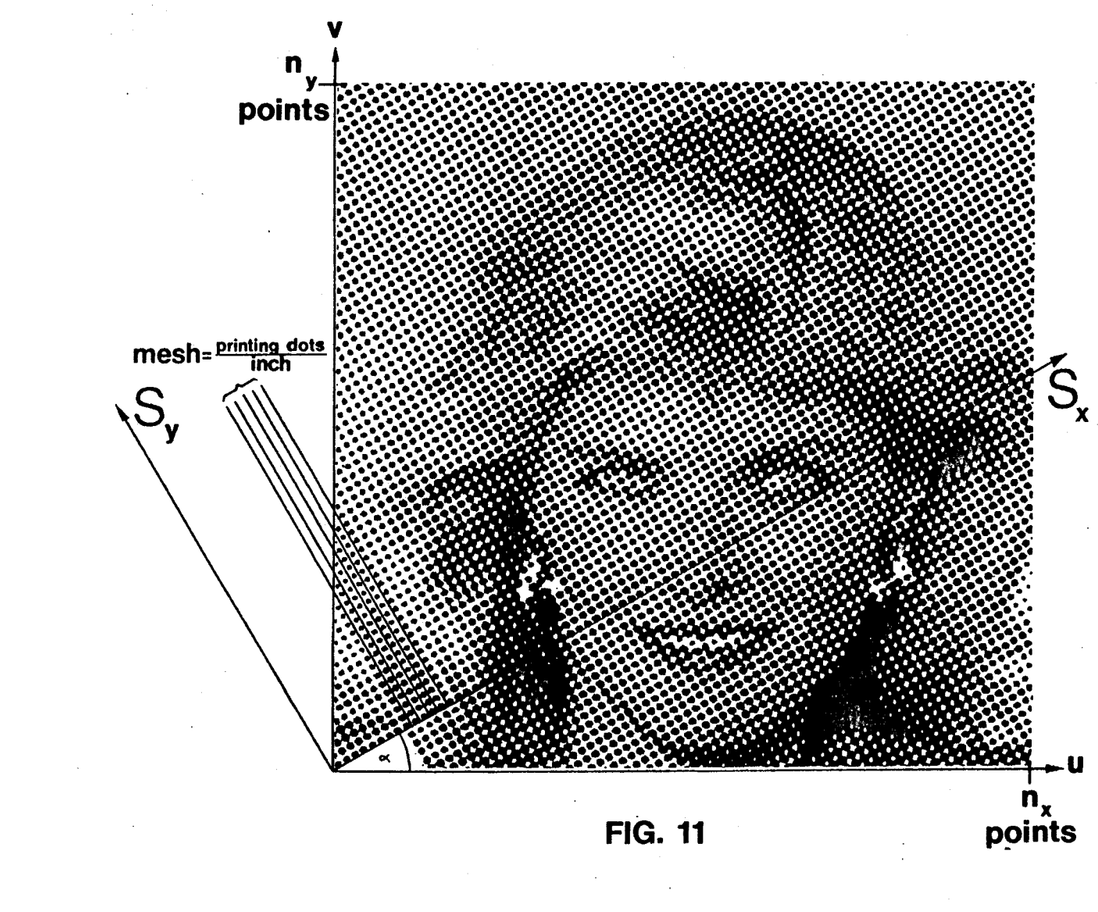
FIG. 11 is an output screened image produced according to the present invention.

FIG. 11 illustrates a screened halftone color separation produced in accordance with a preferred embodiment of the present invention. It is appreciated that the operator, using workstation 16, defines the screen rotation angle α and the mesh of the output screen dots.

It will be appreciated by persons skilled in the art that the present invention is not limited by what has been particularly shown and described hereinabove. Rather the scope of the present invention is defined only by the claims which follow:

I claim:

1. A technique for generating a screened reproduction of an image comprising the steps of:
   providing a representation of an original having input density values of the original,
   storing information representing a plurality of desired dot configurations, corresponding to various possible density values, most of said plurality of desired dot configurations extending over a plurality of regions;
   for each coordinate pair, determining whether the coordinate pair lies in a given region which includes a part of a dot corresponding to the input density of the original;
   in regions which are determined to include a part of a dot, also determining whether a coordinate pair lies within the boundary coordinates of the dot; and
   operating the plotter to write only if the coordinate pair lies inside the boundary coordinates of the dot, thereby to produce a multiplicity of screen dots of configurations representing the input density values of the original.

2. A technique according to claim 1 and wherein said step of determining whether a coordinate pair lies within the boundary coordinates of the dot includes the steps of determining whether one coordinate of the coordinate pair lies within the corresponding boundary coordinate of the dot and determining whether the other coordinate of the coordinate pair lies within the other boundary coordinate of the dot only for those coordinate pairs for which the first coordinate lies within the corresponding boundary coordinate of the dot.

3. A technique according to claim 1 and wherein said step of storing information comprises storing information relating to a plurality of selectable different dot configurations.

4. A technique according to claim 1 and wherein said step of providing a representation comprises scanning the original using a laser scanner having a first pixel resolution.

5. A technique according to claim 4 and wherein said means for operating the plotter is operative to cause the plotter to write with a resolution finer than the first pixel resolution.

6. A technique according to claim 4 and wherein said multiplicity of screen dots are arranged in a screen grid having a second resolution, coarser than the first pixel resolution.

7. A technique according to claim 6 and wherein representation of the original is arranged in a scanner grid pattern and said screen grid is angled with respect to the scanner grid pattern.

8. Apparatus for generating a screened reproduction of an image comprising:
   means for providing a representation of an original having input density values of the original,
   means for storing information representing a plurality of desired dot configurations, corresponding to various possible density values, most of said plurality of desired dot configurations extending over a plurality of regions;
   means for determining, for each coordinate pair, whether the coordinate pair lies in a given region which includes a part of a dot corresponding to the input density of the original;
   additional means for determining, for regions which are determined to include a part of a dot, whether a coordinate pair lies within the boundary coordinates of the dot; and
   means for operating the plotter to write only if the coordinate pair lies inside the boundary coordinates of the dot, thereby to produce a multiplicity of screen dots of configurations representing the input density values of the original.

9. Apparatus according to claim 8 and wherein said means for determining whether a coordinate pair lies within the boundary coordinates of the dot comprises means for determining whether one coordinate of the coordinate pair lies within the corresponding boundary coordinate of the dot and determining whether the other coordinate of the coordinate pair lies within the other boundary coordinate of the dot only for those coordinate pairs for which the first coordinate lies within the corresponding boundary coordinate of the dot.

10. Apparatus according to claim 8 and wherein said means for operating the plotter is operative to cause the plotter to write with a resolution finer than the first pixel resolution.

11. Apparatus according to claim 8 and also comprising operator control means including a workstation.

12. Apparatus according to claim 8 and wherein said means for storing information comprises information relating to a plurality of selectable different dot configurations.

13. Apparatus according to claim 8 and wherein said means for providing a representation comprises a laser scanner having a first pixel resolution.

14. Apparatus according to claim 13 and wherein said multiplicity of screen dots are arranged in a screen grid having a second resolution, coarser than the first pixel resolution.

15. Apparatus according to claim 14 and wherein representation of the original is arranged in a scanner grid pattern and said screen grid is angled with respect to the scanner grid pattern.

* * * * *